No. 640,200. Patented Jan. 2, 1900.
D. W. HUDSON.
LIFTING JACK FOR VEHICLES.
(Application filed Apr. 1, 1899.)
(No Model.)
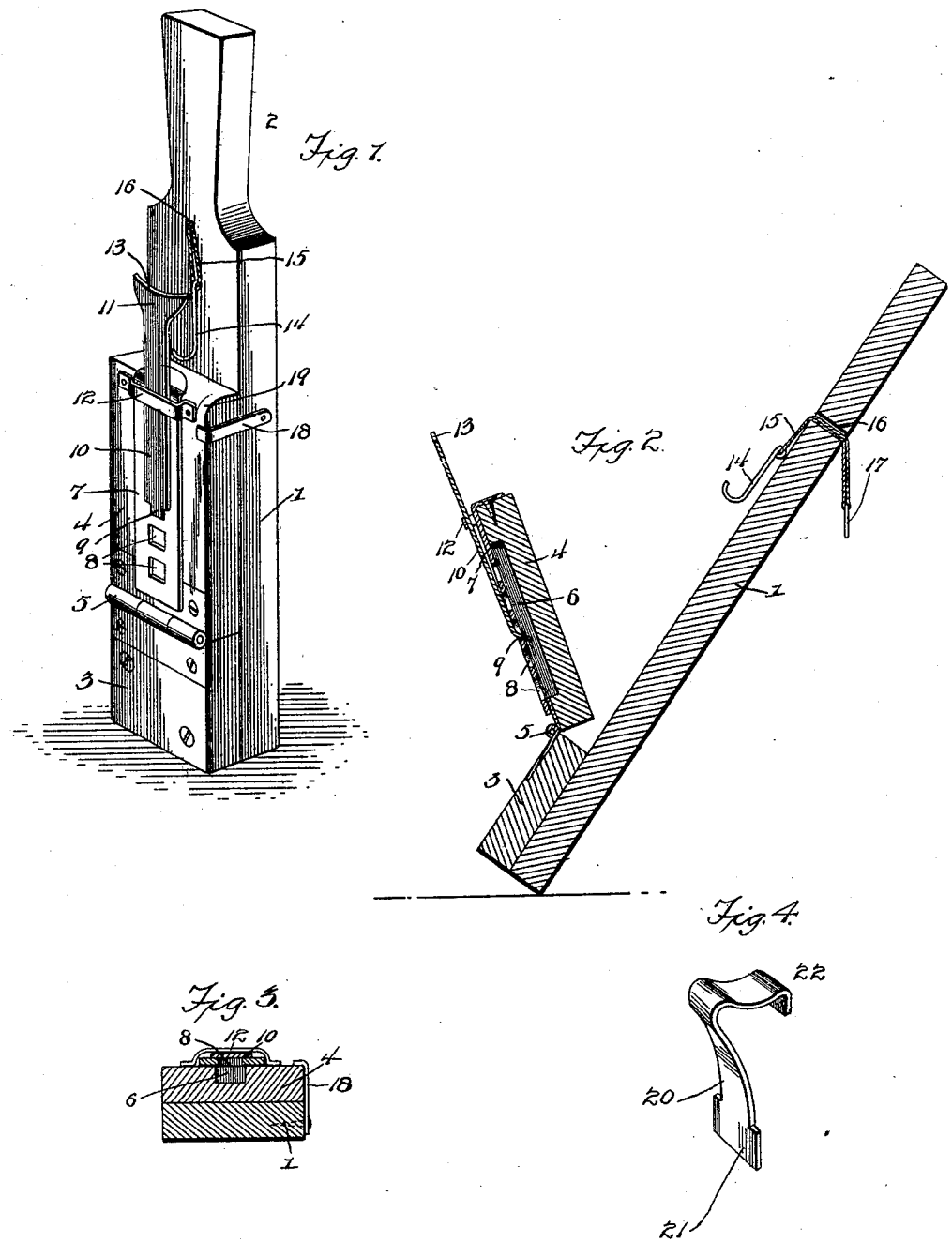
Witnesses
Ralph A. Shepard.
N. S. Riley
D. W. Hudson  Inventor
By his Attorneys,
C. A. Snow & Co.
THE NORRIS PETERS CO., PHOTO-LITHO., WASHINGTON, D. C.

UNITED STATES PATENT OFFICE.

DANIEL W. HUDSON, OF CLINTON, KENTUCKY, ASSIGNOR OF ONE-HALF TO SAMUEL R. SEAY, OF SAME PLACE.

LIFTING-JACK FOR VEHICLES.

SPECIFICATION forming part of Letters Patent No. 640,200, dated January 2, 1900.

Application filed April 1, 1899. Serial No. 711,417. (No model.)

*To all whom it may concern:*

Be it known that I, DANIEL W. HUDSON, a citizen of the United States, residing at Clinton, in the county of Hickman and State of Kentucky, have invented a new and useful Lifting-Jack for Vehicles, of which the following is a specification.

The invention relates to improvements in lifting-jacks for vehicles.

The object of the present invention is to improve the construction of lifting-jacks for vehicles and to provide a simple, inexpensive, and efficient one adapted to be readily engaged with the running-gear of a vehicle and arranged to permit a wheel to be partially removed for lubricating the axle or to be wholly removed for other purposes.

The invention consists in the construction and novel combination and arrangement of parts hereinafter fully described, illustrated in the accompanying drawings, and pointed out in the claims hereto appended.

In the drawings, Figure 1 is a perspective view of a lifting-jack constructed in accordance with this invention, the hinged standard being locked against the lever. Fig. 2 is a longitudinal sectional view of the same, the hinged standard being arranged at an angle to the lever. Fig. 3 is a transverse sectional view. Fig. 4 is a detail perspective view showing a detachable support for engaging an axle between the body of a vehicle and the hub of a wheel.

Like numerals of reference designate corresponding parts in all the figures of the drawings.

1 designates a lever having its upper end shaped into a handle 2 and provided at its lower end with a support 3, preferably consisting of a block, and having a movable standard 4 connected with it by a hinge 5, whereby the standard is adapted to swing to and from the lever, for a purpose hereinafter described. The hinged standard is provided at its outer face with a longitudinal groove 6, which is covered by a plate 7, provided with openings 8, arranged at intervals and forming a longitudinal series of sockets adapted to be engaged by a tongue 9 of a movable support 10, whereby the latter is adjustably connected to the standard and is adapted to be raised and lowered to adapt it to the height of a wheel or the action of a vehicle. The adjustable support consists of a shank or bar provided at its upper end with a head 11 and arranged in a guide or keeper 12, located near the top of the hinged standard and permitting the shank or bar of the support to slide through it freely. The tongue or lug at the lower end of the shank or bar extends inward, as shown, and is adapted to interlock with the plate of the standard.

The head 11 of the vertically-adjustable support is provided with a curved upper edge 13, forming a concave seat for the reception of the hub of a wheel. The adjustable support is adapted to be placed beneath the outer portion of the hub of a wheel, with the lever arranged at an angle to the standard and with the lower end of the lever substantially beneath the support, and by swinging the lever inward the wheel will be lifted clear of the ground or other support. The wheel is then engaged by a hook 14, connected to a line 15, extending through an opening 16 of the lever and provided at its outer end with a ring 17 or other suitable form of grip. The hook engages one of the spokes of the wheel and by drawing outward on the line the wheel is carried to the point or outer end of the spindle and there is no liability of the hub accidentally slipping off the adjustable support. The wheel is locked in such extended position by a pivoted L-shaped catch 18, consisting of a shank or bar mounted on one of the edges of the lever at a point between the ends thereof and having its outer end bent at an angle to engage the outer face of the hinged standard, which has its upper edge rounded, as shown at 19, to permit the catch to engage its outer face. Instead of employing a rope or cord to form a line for the hook a wire, chain, or any other suitable flexible connection may be used.

When it is desired to remove a wheel entirely from an axle, the support 10 (shown in Figs. 1 and 2 of the accompanying drawings) is replaced by the device shown in Fig. 4. This device consists of a detachable support 20, having an inwardly-extending arm 22 at its upper end and provided at its lower end with an enlarged portion or bearing 21, adapted to fit against the outer face of the standard 4. The arm 22, which rests upon the upper end of the standard, is provided with a depending lug adapted to engage the inner face of the same, whereby it is detachably mounted on the said standard. The top or head of the support, which is arranged at right angles to the head of the support 10, is adapted when placed beneath an axle to extend transversely thereof, and it is depressed, as shown, to form a seat for the said axle. The support 20 is adapted to engage the axle at a point between the wagon-body and the inner end of the hub of a wheel, and the device will maintain the running-gear in an elevated position while the wheel is being removed from and replaced on the axle.

The invention has the following advantages: The lifting-jack, which is exceedingly simple and inexpensive in construction and which may be constructed of any suitable material, possesses great strength and durability and is easily manipulated without adjusting-screws and similar fastening devices. It is adapted to enable a wheel to be partially removed from a spindle for lubricating the same, and there is no liability of the hub of a wheel accidentally slipping off the adjustable support while the wheel is being drawn outward to the end of the spindle by the wheel-engaging device, which is mounted on the lever at a point above the standard. The device is also adapted to engage an axle of a vehicle at a point between the body and the inner end of the hub of a wheel, and either of the supports may be readily substituted for the other to permit the device to engage a wheel or an axle. The pivoted catch is adapted to be readily swung into and out of engagement with the hinged standard, and the tongue or projection of the adjustable support is readily engaged with any one of the sockets of the standard.

Changes in the form, proportion, size, and the minor details of construction within the scope of the appended claims may be resorted to without departing from the spirit or sacrificing any of the advantages of this invention.

What is claimed is—

1. A device of the class described, comprising a lever, a wheel-engaging device mounted on the lever and adapted to move independently thereof, and an L-shaped catch pivoted to one edge of the lever, combined with a standard hinged to the lever at its lower end, and a line extending through the opening or guide and provided at its outer end with a grip or handle, substantially as shown.

2. A device of the class described comprising a lever, a standard hinged to the lever, and a wheel-engaging device mounted on the lever and adapted to move independently thereof, whereby a wheel is drawn outward and is prevented from slipping off the device, substantially as described.

3. A device of the class described comprising a lever provided with an opening or guide, a standard hinged to the lever, a line extending through the opening or guide and provided at its outer end with a grip or handle, and a spoke-engaging device mounted on the inner end of the line, substantially as described.

In testimony that I claim the foregoing as my own I have hereto affixed my signature in the presence of two witnesses.

DANIEL W. HUDSON.

Witnesses:
LONZO CRAIG,
J. D. WILLIAMS.